(12) United States Patent
Segall

(10) Patent No.: US 7,760,949 B2
(45) Date of Patent: Jul. 20, 2010

(54) METHODS AND SYSTEMS FOR CODING MULTIPLE DYNAMIC RANGE IMAGES

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 833 days.

(21) Appl. No.: 11/672,935

(22) Filed: Feb. 8, 2007

(65) Prior Publication Data

US 2008/0193032 A1    Aug. 14, 2008

(51) Int. Cl.
*G06K 9/36* (2006.01)
(52) U.S. Cl. .................... 382/232; 382/238
(58) Field of Classification Search ......... 382/232–251, 382/274–275, 298–299, 254; 375/240.01–240.27
See application file for complete search history.

(56) References Cited

U.S. PATENT DOCUMENTS

| | | | |
|---|---|---|---|
| 5,500,677 A | 3/1996 | Fert et al. | |
| 5,603,012 A | 2/1997 | Sotheran | |
| 5,777,678 A | 7/1998 | Ogata et al. | |
| 5,832,120 A | 11/1998 | Prabhakar et al. | |
| 5,930,397 A | 7/1999 | Tsujii et al. | |
| 6,057,884 A | 5/2000 | Chen et al. | |
| 6,396,422 B1 | 5/2002 | Barkan | |
| 6,400,996 B1 | 6/2002 | Hoffberg et al. | |
| 6,490,320 B1 | 12/2002 | Vetro | |
| 6,493,386 B1 | 12/2002 | Vetro | |
| 6,574,279 B1 | 6/2003 | Vetro | |
| 6,748,020 B1 | 6/2004 | Eifrig et al. | |
| 6,765,931 B1 | 7/2004 | Rabenko | |
| 6,795,501 B1 | 9/2004 | Zhu et al. | |
| 6,829,301 B1 | 12/2004 | Tinker et al. | |
| 6,850,252 B1 | 2/2005 | Hoffberg | |
| 6,867,717 B1 | 3/2005 | Ion et al. | |
| 6,879,731 B2 | 4/2005 | Kang et al. | |

(Continued)

FOREIGN PATENT DOCUMENTS

EP    0644695    3/1995

(Continued)

OTHER PUBLICATIONS

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.

(Continued)

*Primary Examiner*—Sherali Ishrat
(74) *Attorney, Agent, or Firm*—Krieger Intellectual Property, Inc.; Scott C. Krieger

(57) ABSTRACT

Aspects of the present invention relate to systems and methods for encoding and decoding digital images. Some aspects relate to a method for encoding and decoding image data wherein a prediction base image based on a low dynamic range (LDR) image and a high dynamic range (HDR) image corresponding to the LDR image are analyzed and a difference image is determined in the spatial domain, wherein the difference image represents the difference between the prediction base image and the HDR image. In some cases, the difference image values are quantized and sorted into an order based on the values of corresponding pixels in the LDR image.

23 Claims, 6 Drawing Sheets

U.S. PATENT DOCUMENTS

| | | | |
|---|---|---|---|
| 6,895,052 | B2 | 5/2005 | Hanamura et al. |
| 6,968,007 | B2 | 11/2005 | Barrau |
| 6,996,173 | B2 | 2/2006 | Wu |
| 7,006,881 | B1 | 2/2006 | Hoffberg et al. |
| 7,010,174 | B2 | 3/2006 | Kang et al. |
| 7,305,144 | B2 * | 12/2007 | Fattal et al. ............... 382/274 |
| 2002/0054638 | A1 | 5/2002 | Hanamura |
| 2002/0154694 | A1 | 10/2002 | Birch |
| 2003/0035488 | A1 | 2/2003 | Barrau |
| 2003/0043908 | A1 | 3/2003 | Gao |
| 2003/0112863 | A1 | 6/2003 | Demos |
| 2003/0194007 | A1 | 10/2003 | Chen |
| 2004/0001547 | A1 | 1/2004 | Mukherjee |
| 2004/0151249 | A1 | 8/2004 | Morel |
| 2005/0013501 | A1 | 1/2005 | Kang et al. |
| 2005/0030315 | A1 | 2/2005 | Cohen et al. |
| 2005/0147163 | A1 | 7/2005 | Li |
| 2006/0002611 | A1 | 1/2006 | Mantiuk et al. |
| 2006/0077405 | A1 | 4/2006 | Topfer et al. |
| 2006/0083303 | A1 | 4/2006 | Han et al. |
| 2006/0126962 | A1 | 6/2006 | Sun |
| 2006/0153294 | A1 | 7/2006 | Wang et al. |
| 2006/0200253 | A1 | 9/2006 | Hoffberg et al. |
| 2006/0200258 | A1 | 9/2006 | Hoffberg et al. |
| 2006/0200259 | A1 | 9/2006 | Hoffberg et al. |
| 2006/0200260 | A1 | 9/2006 | Hoffberg et al. |
| 2006/0209959 | A1 | 9/2006 | Sun |
| 2006/0210185 | A1 | 9/2006 | Sun |
| 2006/0221760 | A1 | 10/2006 | Chen |
| 2006/0251330 | A1 | 11/2006 | Toth et al. |
| 2007/0140354 | A1 | 6/2007 | Sun |
| 2007/0160133 | A1 | 7/2007 | Bao et al. |
| 2007/0201560 | A1 * | 8/2007 | Segall et al. ........... 375/240.24 |
| 2008/0175496 | A1 * | 7/2008 | Segall ....................... 382/238 |

FOREIGN PATENT DOCUMENTS

| | | |
|---|---|---|
| EP | 0966162 | 12/1999 |
| EP | 1170954 A1 | 1/2002 |
| EP | 1195992 A1 | 4/2002 |
| EP | 1248466 A1 | 10/2002 |
| GB | 2288957 A1 | 1/1995 |
| JP | 2005-056271 | 3/1993 |
| JP | 7162870 | 6/1995 |
| JP | 9070044 | 3/1997 |
| JP | 9182085 | 7/1997 |
| JP | 1018085 | 1/1999 |
| JP | 11331613 | 11/1999 |
| JP | 2000184337 | 6/2000 |
| JP | 2004-363931 | 12/2004 |
| JP | 2005-80153 | 3/2005 |
| JP | 2005-094054 | 4/2005 |
| JP | 2005-167431 | 6/2005 |

OTHER PUBLICATIONS

Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201 ; 22$^{nd}$ Meeting: Marrakech, Morocco, Jan. 13-19, 2007.
International Search Report for PCT/JP2008/054687.
Joint Video Team (JVT) of ISO/IEC MPEG & ITU-T VCEG,Advanced video coding for generic audiovisual services, ISO/IEC 14496-10, JVT-T201, Austria, Jul. 2006.
International Telecommunication Union, Series H: Audiovisual and Multimedia Systems; Coding of Moving Video; H.264, Mar. 2005.
Internation Telecommunication Union, ISO/IEC 13818-2 MPEG-2, Geneva, 1995.
International Organisation for Standardisation, MPEG-4 Version 2 Visual Working Draft Rev 5.0, Atlantic City, Oct. 1998.
International Telecommunication Union, Series H: Audiovisual and Multimedia Systems; Video coding for low bit rate communication; H.263, Geneva, Jan. 2005.
Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, p. 134-135.
PCT/JP2007/064040 International Search Report.
Office action dated Sep. 3, 2008 for U.S. Appl. No. 11/776,430.
F. Durand and J. Dorsey, "Fast Bilateral Filtering for the Display of High-Dynamic-Range Images", Proceedings of SIGGRAPH, San Antonio, TX, Jul. 21-26, 2002.
R. Fattal, D. Lischinski and M. Werman, "Gradient Domian High Dynamic Range Compression", Proceedings of SIGGRAPG, San Antonio, TX, Jul. 21-26, 2002.
Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) 20$^{th}$ Meeting: Klagenfurt, Austria, Jul. 15-21, 2006, JVT-T061.
L. Meylan and S. Susstrunk, "High Dynamic Range Image Rendering with a Retinex-Based Adaptive Filter", IEEE Transactions on Image Processing, Sep. 2005.
S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.
E. Reinhard, M. Stark, P. Shirley and J. Ferwerda, "Photographic Tone Reproduction for Digital Images", Proceedings of SIGGRAPH, San Antonio, TX, Jul. 21-26, 2002.
G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.
Brightside Technologies, Inc., "DR37-P: Detailed Preliminary Specifications—V2.0", http://www.brightsidetech.com/products/info/dr37p_specs.pdf.
Y Li, L. Sharan and E. Adelson, "Compressing and Companding High Dynamic Range Images with Subband Architectures", ACM Transactions on Graphics (Proceedings of SIGGRAPH '05), vol. 24, No. 3, Jul. 2005.
R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.
H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.
H. Seetzen, G. Ward, and L. Whitehead, "High Dynamic Range Display Using Low and High Resolution Modulators," The Society for Information Display International Symposium, Baltimore, Maryland, May 2003.
G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.
International Search Report for International Application No. PCT/JP2007/050277.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.
Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 * section 8.4.2.2.1 * .
Julien Reichel, Heiko Schwarz and Mathias Wien, "Scalable Video Coding—Working Draft 4", JVT-Q201, Nice, FR, Oct. 2005.

* cited by examiner

METHODS AND SYSTEMS FOR CODING MULTIPLE DYNAMIC RANGE IMAGES

FIELD OF THE INVENTION

Embodiments of the present invention comprise methods and systems for encoding and decoding digital images.

BACKGROUND

Transmission and storage of digital images can be improved by increasing the efficiency of the encoding and decoding processes. Images can be represented more compactly when image information is recorded using fewer bits of data.

SUMMARY

Some embodiments of the present invention comprise methods and systems for encoding and decoding digital images. In some embodiments a high dynamic range version of an image may be represented by a difference or residual image calculated from a prediction base image and a high dynamic range image. In some embodiments, the prediction base image may be related to a low dynamic range image. In some embodiments, values in the difference image may be resorted and processed to improve coding efficiency.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
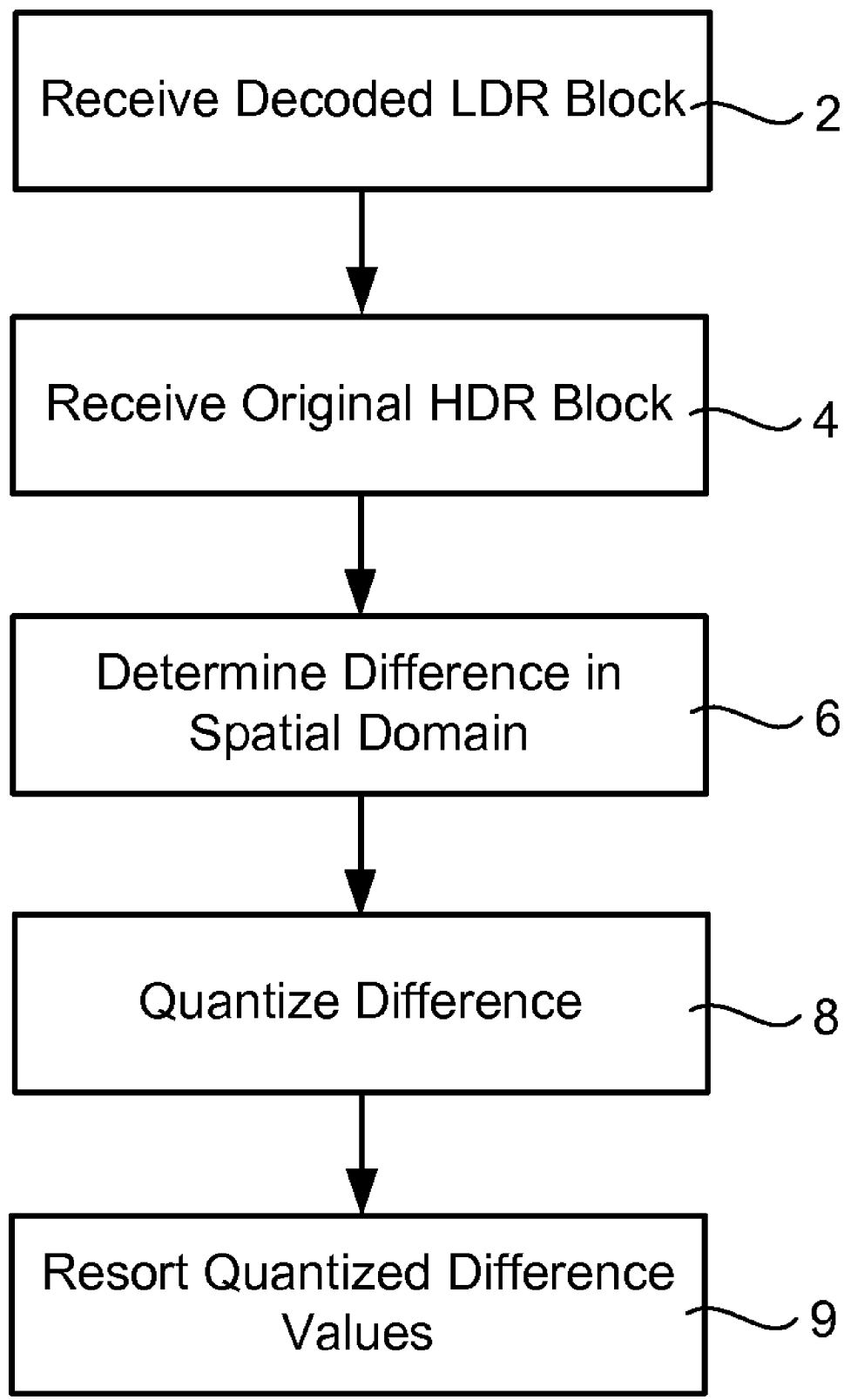
FIG. 1 is a chart showing an embodiment of the present invention comprising resorting of quantized difference values.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention relate to coding the difference between a high dynamic range (HDR) and a standard dynamic range (SDR) video signal. Other related embodiments are described in U.S. patent application Ser. No. 11/362,571, entitled "Methods and Systems for High Dynamic Range Video Coding," by Christopher Andrew Segall and Louis Joseph Kerofsky, which is incorporated herein by reference. Those embodiments comprise a system for the layered coding of SDR and HDR material as well as several tools for predicting and refining the HDR signal from a decoded SDR frame. Embodiments of the present invention comprise methods and systems for coding HDR residual data in the spatial domain. These techniques are particularly well motivated for image content that contains small, impulsive objects and for video coding systems that utilize transforms with large spatial support.

In some embodiments of the present invention, a low dynamic range and HDR versions of an image sequence may be created. These two sequences may be related by a tone mapping operation that maps the HDR data into the lower dynamic range. In some embodiments, this tone mapping operation may be non-unique, and very bright/dark data in the HDR signal may be mapped to less bright/dark data in the lower dynamic range.

In these embodiments, the low dynamic range version of the image sequence may then be coded utilizing a video coding system. The output of the coding process may be a bit-stream suitable for transmission and/or storage. Moreover, the output bit-stream may be decodable and viewable on legacy (low dynamic range) devices.

In these embodiments, the HDR version of the image sequence may also be coded utilizing a video codec. However, unlike coding the low dynamic range sequence, the HDR version may not be represented directly. In some embodiments, a prediction for the HDR image sequence may be derived from decoded low dynamic range material. The video codec may then code the residual difference between the original and predicted HDR sequence in a bit-stream. The output of the coding process may then be transmitted and/or stored along with the first bit-stream. In some embodiments, this output bit-stream may only be decodable and viewable on devices that can first decode the standard dynamic range material and then the HDR enhancement information.

Some embodiments of the present invention relate to coding the residual differences between an HDR image sequence and its predicted version. Some embodiments may bypass or omit the transform operator and code the residual in the spatial domain. Some embodiments may provide a sparse set of residual values when most intensity values in the HDR image sequence are unaltered by the tone mapping operation and therefore appear in the SDR representation. Some embodiments may support small impulsive objects. For transform coding, these objects result in a significant amount of high frequency data that is difficult to code. In these embodiments, the spatial extent of the feature is small so it is easy to code. Some embodiments may simplify the task of estimating locations of HDR information from the decoded, lower dynamic range sequence. In some embodiments, these locations can be identified by pixel intensities that are clipped (or nearly so) to the dynamic range of the lower dynamic range. By coding this value in the spatial domain, it is straightforward to code these values while not sending residual for the remaining image locations. Some embodiments may also simplify the decoder. Coding values directly in the spatial domain does away with the need to take forward and inverse transforms. When the cost of enabling/disabling an embodiment is small, this will result in complexity savings.

Some embodiments of the present invention comprise coding of the residual difference between a prediction base image derived from a reconstructed (or decoded) low dynamic range image and an original high dynamic range image frame. In some embodiments, the residual may be calculated using the reconstructed LDR image directly. In these embodiments, the LDR image is the prediction base image. In other embodiments, the reconstructed LDR image may be modified to an alternate form to create a prediction base image that is then used for residual calculation. In some embodiments, the LDR image may also have a different spatial resolution than the HDR image and in some of these embodiments upscaling or downscaling may be used to create a prediction base image or otherwise process an LDR image or HDR image. In the descriptions of the exemplary embodiments herebelow, it is assumed that the frames are divided into blocks, which are aligned. These exemplary embodiments relate to a low dynamic range image sequence that is coded with a standards based, H.264/MPEG-4 Advanced Video Coding (AVC) compatible video codec. This codec is described in ITU-T Recommendation H.264|ISO/IEC 14496-10, *Advanced Video Coding for Generic Audiovisual Services*, March 2005, which is hereby incorporate herein by reference. Alternative embodiments may relate to other video coding systems, non-aligned frames and low dynamic range and high dynamic range sequences that differ in spatial resolution.

Exemplary Embodiment 1

A first embodiment of the present invention may take a decoded, low dynamic range block and an original HDR block as input. The difference between the blocks may then be calculated in the spatial domain. This residual difference may then be quantized. In some embodiments, the data may be quantized with the following formula $$f_{Qp}(x, y) = \text{round}\left[\left(\frac{f(x, y)}{Qp} + \alpha\right)\right] * Qp$$

where Qp is a quantization parameter and α is an offset employed by the encoder and optionally known to the decoder. In alternative embodiments, the residual difference may be treated as transform coefficients inside the video codec and quantized using the same technique. These alternative embodiments may require that the spatial difference be multiplied by weights prior to quantization. This is due to the scaling that is part of the AVC video coding system. Once the spatial differences are calculated, the differences are resorted. This resorting places pixel locations that are more likely to need refinement at the beginning of the coefficient list. This resorting process may be performed in several ways:

Resorting Process 1

In this first approach, the quantized pixel differences are resorted according to the intensity value of the collocated pixel (or pixels) in the decoded low dynamic range sequence. In other words, residual values are sorted according to the brightness of the decoded low dynamic range sequence. To make this sorting unique, the pixel values may also be ordered in a known scan pattern, such as row-by-row or column-by-column, so that the mapping between residual values and locations within a block are unique. When the LDR sequence and the HDR sequence have different spatial resolutions, multiple pixel values in one sequence may correspond to one or more values in the other sequence. In these embodiments, an intensity value (e.g., average intensity value, interpolated intensity value) may be calculated from one or more corresponding pixel values and may be used as an index in the resorting process.

Resorting Process 2

In this second approach, residual values are resorted according to a known threshold. The threshold divides the pixel locations into two classes or sets. Pixel locations where the decoded, low dynamic range intensity value is greater than the threshold are assigned to the first set. The remaining pixel locations are assigned to the second set. The residual values in the first set are placed at the beginning of the resorted list, and values within this set are ordered by a known scan pattern. The remaining residual values immediately follow the first set and are also ordered by a known scan pattern.

Resorting Process 3

In this third approach, the method described in Resorting Process 2 is utilized. However, multiple thresholds are defined and the residual values are sorted by class as before. Within each class, the residual values are sorted by a known scan pattern, also as defined before.

Resorting Process 4

In this fourth approach, either of the previous methods is utilized. However, one class is defined to contain no residual information. Thus, pixel locations within this class are assigned a residual value of zero. This is regardless of the actual residual difference at that location.

In the above resorting processes, it is assumed that the HDR image frame only contains pixel information brighter than the decoded low dynamic range image sequence. In applications where this is untrue, and the HDR frame contains pixel values lower than the low dynamic range image sequence, the previous approaches can still be employed. However, in these embodiments, the threshold definitions also describe when the threshold defines the minimum value within the class or the maximum value within the class.

After re-sorting the residual values, the residual information may be written to a bit-stream for eventual transmission to a decoder. The quantized residual information can be written in the same manner as traditional quantized transform coefficients. In the case where context adaptive signaling is employed, the encoder may optionally utilize and signal alternative context states/tables for signaling the residual data. In an exemplary embodiment, the process may take the quantized residual information in the pixel domain and encode it in the exact manner as transform coefficients in the AVC specification. In some embodiments, a different context state may be utilized.

Exemplary Embodiment 2

This second exemplary embodiment adds an additional step to the first embodiment. Residual values are still calculated in the pixel domain and resorted. However, the residual values may not be quantized prior to resorting. Instead, the residual values may be transformed. The resulting transform coefficients may then be quantized and transmitted to the decoder.

Exemplary Embodiment 3

This third embodiment extends the second embodiment. Here, the residual values are calculated and resorted. However, the residual values are scaled prior to quantization. The degree of scaling may depend on information about the residual data. In some exemplary embodiments, the scaling information may be a function of the corresponding, decoded low dynamic range pixel value such as $$W(x, y) = \frac{255}{1 + LDR(x, y)}$$

where W(x,y) and LDR(x,y) are respectively the value of the weighting function and decoded low dynamic range frame at pixel locations x and y. In some embodiments, more sophisticated functions may be used. The encoder may then apply the weighting coefficients to each residual value prior to computing the transform. The resulting transform coefficients are quantized and transmitted to the decoder.

At the decoder, the process may be reversed. The quantized data may be "de-quantized"/scaled, and the inverse transform may be computed. The resulting residual values may then be scaled by a second weighting function, resorted by reversing the sort operation and finally added to the decoded, low dynamic range signal. Some embodiments may combine the "de-quantization"/scaling procedure with the process of scaling by a second weighting function.

In some embodiments, the weighting functions described in the encoder and decoder may be related in very sophisticated ways. For many applications, these weighting functions will be different and related as an inverse operation. That is, the weighting function at the encoder will be the inverse of the weighting operation at the decoder. However, more sophisticated relationships may be used in some embodiments. Specifically, the encoder may design and/or adapt the weighting function given a fixed (and known) weighting process at the decoder. In some embodiments, intelligent choices for the two weighting operators may be dependent on statistics of the underlying signal as well as rate-distortion analysis.

Signaling

Some embodiments of the present invention may comprise an encoder, a decoder or both encoder and decoder in a system. Some embodiments may comprise signaling methods and systems for signaling of information between the encoding and decoding processes.

Class 1 Exemplary Signaling Embodiments

In this first class of signaling embodiments, the encoder may signal to the decoder when the embodiments of the present invention are utilized. This signaling may be a single flag to enable the process, and the flag may be transmitted at any granularity. In some embodiments, the signal may be transmitted on a sequence-by-sequence, picture-by-picture, slice-by-slice, macro-block-by-macro-block or block-by-block basis. In some embodiments, the signaling may be dependent on other information in the transmitted bit-stream. For example, it may be signaled for only certain macro-block modes or only when residual data is present in the bit-stream.

One exemplary mechanism for signaling the flag is to utilize the flag hdr_transform_bypass_flag. Example semantics for this flag are as follows:

hdr_transform_bypass_flag equal to 1 specifies that a transform bypass operation for the transform coefficient decoding process and picture construction process prior to deblocking filter process as specified in subclause A1 shall be applied. hdr_transform_bypass_flag equal to 0 specifies that the transform coefficient decoding process and picture construction process prior to deblocking filter process shall not use the transform bypass operation. When hdr_transform_bypass_flag is not present, it shall be inferred to be equal to 0.

Class 2 Exemplary Signaling Embodiments

In this second class of signaling embodiments, the encoder may signal to the decoder that an embodiment of the present invention is enabled. In some embodiments, this signaling may occur at multiple granularities. In an exemplary embodiment, each granularity may contain the following flags:

hdr_transform_bypass adaptive_flag equal to 1 specifies that the transform bypass operation for the transform coefficient decoded process is signaled at a lower layer.

hdr_transform_bypass_adaptive_flag equal to 0 specifies that the hdr_transform_bypass_flag is signaled in this layer and not present in lower layers.

hdr_transform_bypass_flag equal to 1 specifies that a transform bypass operation for the transform coefficient decoding process and picture construction process prior to deblocking filter process as specified in subclause A1 shall be applied. hdr_transform_bypass_flag equal to 0 specifies that the transform coefficient decoding process and picture construction process prior to deblocking filter process shall not use the transform bypass operation. When hdr_transform_bypass_flag is not present, it shall be inferred to be equal to 0.

In these embodiments, the location and granularity of the hdr_transform_bypass_flag may be determined by the value hdr_transform_bypass_adaptive_flag. For the case that hdr_transform_adaptive_flag is false, the hdr_transform_bypass_flag may be read from the bit-stream at that level/granularity and not transmitted at lower granularities. Moreover, in some embodiments, the hdr_transform_bypass_flag may not be transmitted at lower granularities. For the case that hdr_transform_adaptive_flag is true, the hdr_transform_bypass_flag may not be read from the bit-stream at that level/granularity and may instead be transmitted at lower granularities. Some embodiments may not define the transmission of an hdr_transform_bypass_adaptive_flag at the lowest granularity of signaling.

Embodiments of the present invention may be enabled on a sequence-by-sequence and macro-block-by-macro-block basis. In some embodiments, the sequence header may comprise an hdr_transform_bypass_adaptive_flag and optionally an hdr_transform_bypass_flag. In some embodiments, the macroblock data may only comprise the hdr_transform_bypass_flag when the hdr_transform_bypass_adaptive_flag in the sequence header is true.

Some embodiments may comprise extensions of these signaling methods to a larger number of granularities and/or different granularities.

Class 3 Exemplary Signaling Embodiments

In this third embodiment, the encoder may transmit information to the decoder regarding the classification procedure utilized for the resorting operation. In some exemplary embodiments, the encoder may signal the thresholds utilized for the resorting process. Alternatively, the encoder may signal the scan pattern utilized for the resorting process. As in the previous embodiments, this information can be transmitted at any granularity in the bit-stream. This information may also be transmitted at multiple granularities. In some embodiments, the methods described in Class 2 exemplary signaling embodiments may be used to convey this information.

Class 4 Exemplary Signaling Embodiments

In this fourth class of embodiments, the encoder may transmit information about the weighting function utilized in the invention. In some exemplary embodiments, the actual weighting function may be sent as a look up table. Alternatively, parameters describing the weighting function may be transmitted. In some embodiments, the weighting parameter may be a function of the decoded, low dynamic range intensity values. In these embodiments, the look up table could be sent or parameterized.

Class 5 Exemplary Signaling Embodiments

In this fifth class of embodiments, the encoder may transmit information about multiple weighting functions to the decoder. Then, the encoder may signal to the decoder the weighting function to utilize for a given coding unit. This may also occur at any granularity in the bit-stream. In alternative embodiments, the encoder may transmit parameters for the weighting operation at any granularity. In embodiments wherein this signaling occurs at a block-by-block or macro-block-by-macro-block basis, a high level of adaptivity is achieved within the system.

Some embodiments of the present invention may be described in relation to FIG. 1. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the prediction base image or the LDR image 2 and the HDR image 4 may then be determined. This difference image 6 may then be quantized 8 according to a variety of methods. Some of these quantization methods are described above. The quantized difference values may then be resorted 9. In some embodiments, these difference values may be resorted 9 according to the enumerated resorting processes described above. In some embodiments, the resorted values may be further processed.

Figure 2:
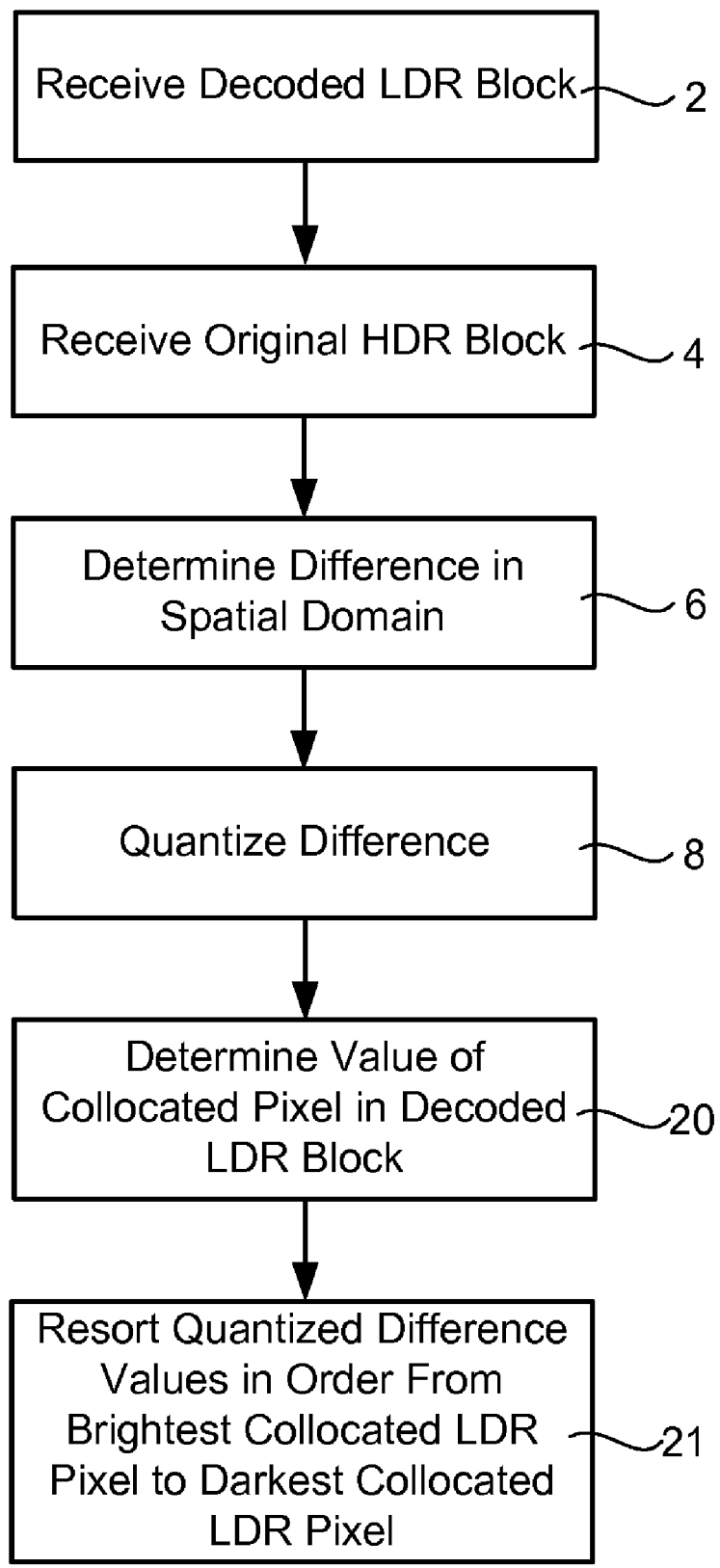
FIG. 2 is a chart showing an embodiment of the present invention comprising resorting of quantized difference values in relation to the intensity of the corresponding low dynamic range image pixel value.

Some embodiments of the present invention may be described in relation to FIG. 2. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the LDR image 2 or a prediction base image based on the LDR image and the HDR image 4 may then be determined. This difference image 6 may then be quantized 8 according to a variety of methods. Some of these quantization methods are described above. The values of the collocated pixels in the decoded LDR image may then be determined 20. These values may be used to determine a resorting order for the difference image values. In some embodiments, the quantized difference image values may be resorted 21 in an order wherein the quantized difference image value corresponding to the brightest collocated decoded LDR image value is first in said order, the quantized difference image value corresponding to the next-brightest collocated decoded LDR image value is next in said order and so on until the last quantized difference image value corresponds to the darkest collocated decoded LDR image value.

Figure 3:
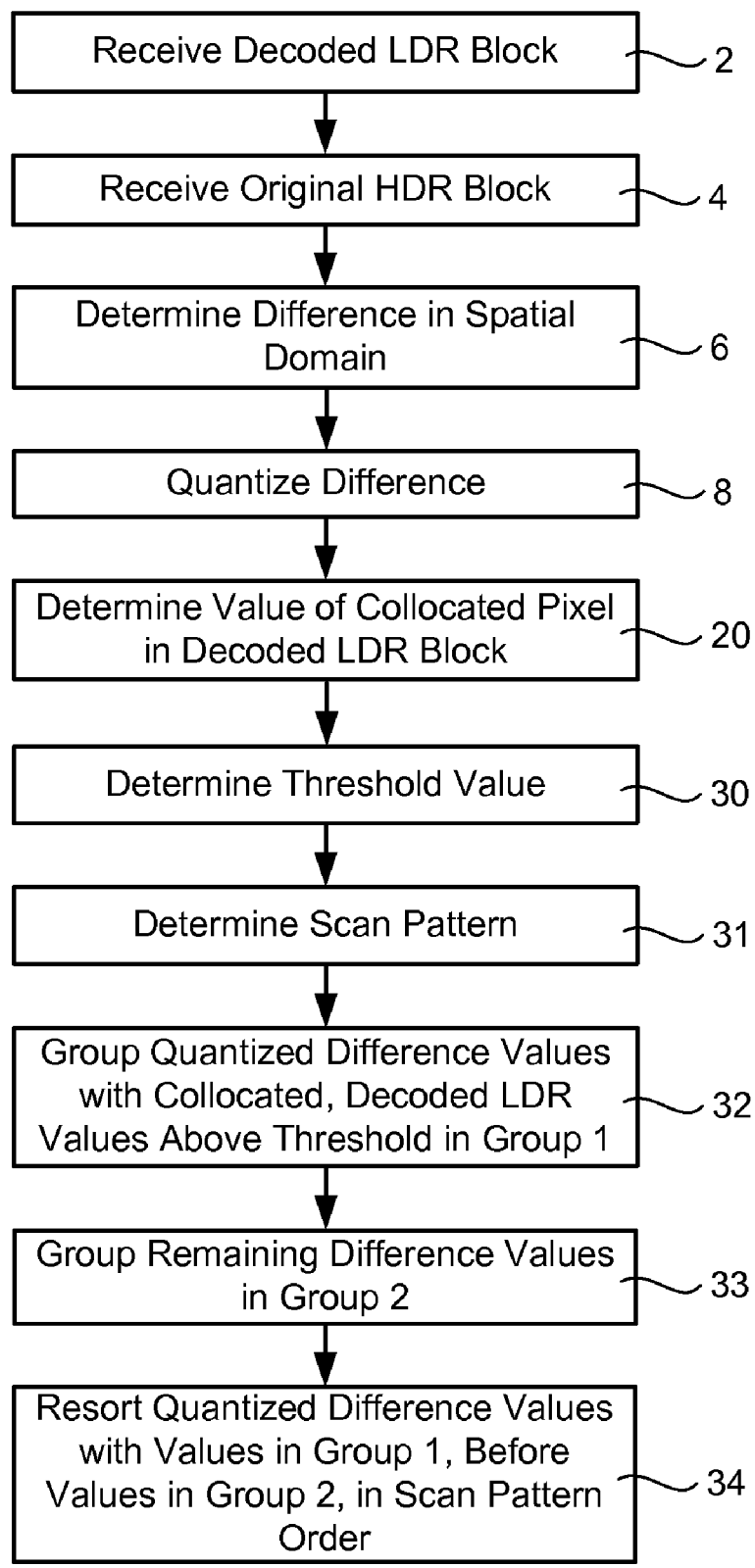
FIG. 3 is a chart showing an embodiment of the present invention comprising grouping quantized difference values based on the relationship of a corresponding low dynamic range image pixel value to a threshold value.

Some embodiments of the present invention may be described in relation to FIG. 3. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the LDR image 2 or a prediction base image based on the LDR image and the HDR image 4 may then be determined. This difference image 6 may then be quantized 8 according to a variety of methods. Some of these quantization methods are described above. One or more threshold values may then be determined 30. A scan pattern may also be established 31 to ensure unique addressing of values.

In these embodiments, a plurality of quantized difference image value groups are established. Quantized difference image values may be grouped according to the value of their collocated decoded LDR image values and the relationship between those LDR values and the threshold values. In some embodiments, a first group of quantized difference image values may be formed 32 with quantized difference values that correspond to a decoded LDR image value above a threshold value. In some embodiments, a second group of quantized difference image values may be formed 33 with those difference image values corresponding to decoded LDR image values below a threshold value. Values in the first group may then be ordered 34 ahead of those in the second group. In some embodiments, further groups and threshold values may be used. Values within these groups may be ordered according to an established scan pattern or by other methods.

Figure 4:
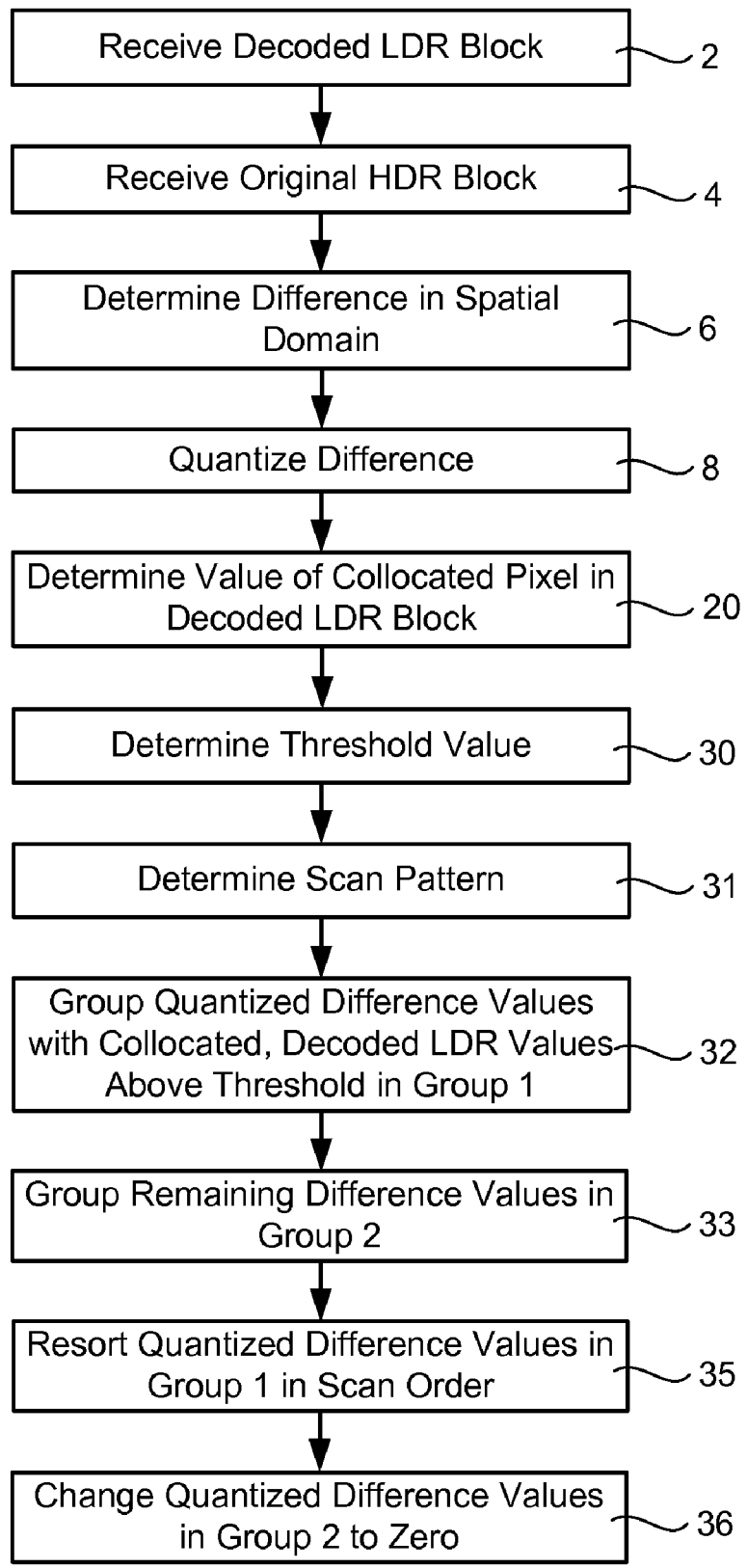
FIG. 4 is a chart showing an embodiment of the present invention comprising resorting of quantized difference values and changing specific values to zero.

Some embodiments of the present invention may be described in relation to FIG. 4. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the LDR image 2 or a prediction base image based on the LDR image and the HDR image 4 may then be determined. This difference image 6 may then be quantized 8 according to a variety of methods. Some of these quantization methods are described above. One or more threshold values may then be determined 30. A scan pattern may also be established 31 to ensure unique addressing of values.

In these embodiments, a plurality of quantized difference image value groups are established. Quantized difference image values may be grouped according to the value of their collocated decoded LDR image values and the relationship between those LDR values and the threshold values. In some embodiments, a first group of quantized difference image values may be formed 32 with quantized difference values that correspond to a decoded LDR image value above a threshold value. In some embodiments, a second group of quantized difference image values may be formed 33 with those difference image values corresponding to decoded LDR image values below a threshold value. Values in the first group may then be ordered 35 ahead of those in the second group. In some embodiments, further groups and threshold values may be used. Values within these groups may be ordered according to an established scan pattern or by other methods. In some embodiments, the quantized difference values in a group may be changed 36 to a preset value. In some embodiments, the quantized difference values of a group may be set to zero.

Figure 5:
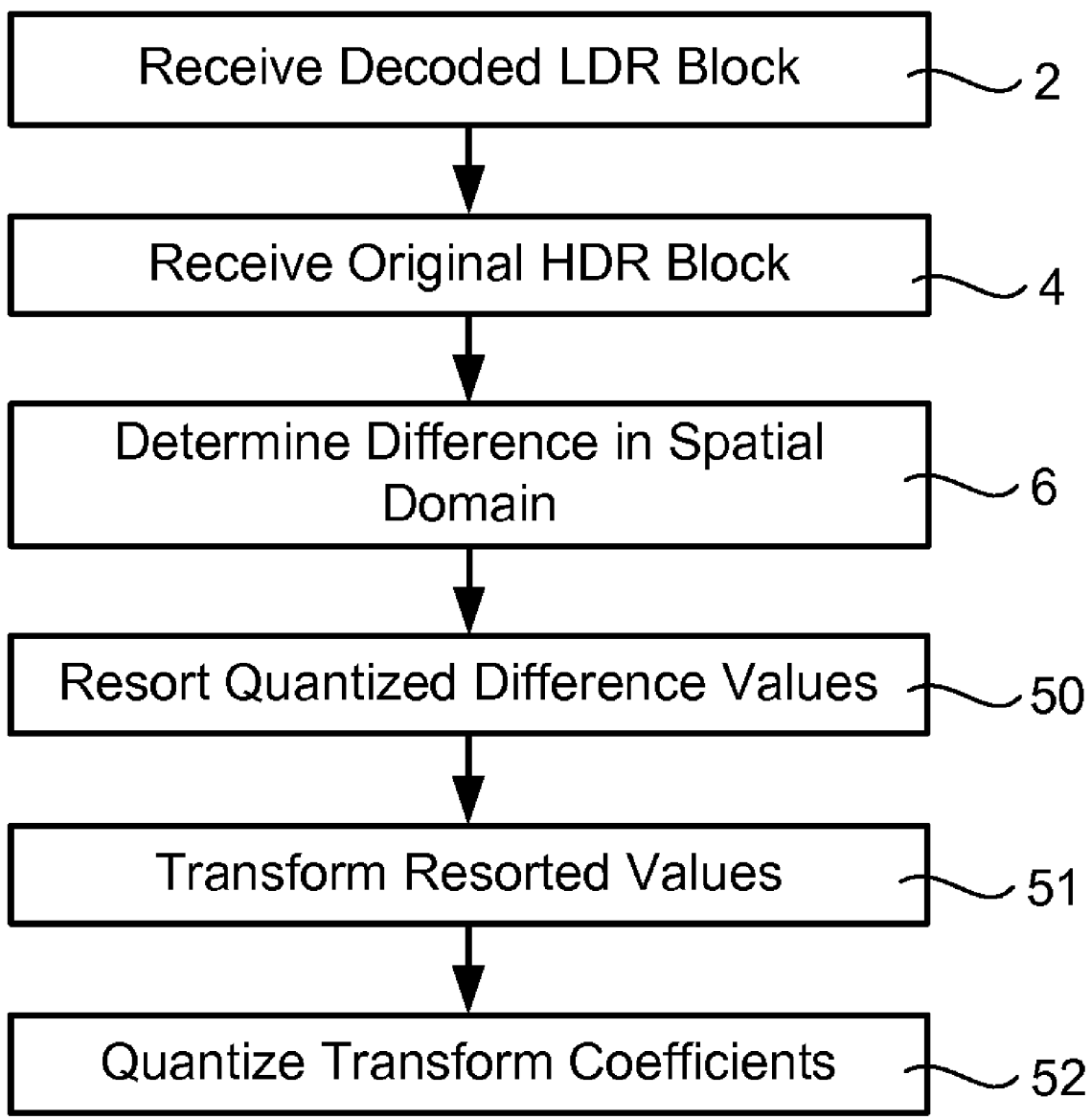
FIG. 5 is a chart showing an embodiment of the present invention comprising resorting of quantized difference values and transformation of those values.

Some embodiments of the present invention may be described in relation to FIG. 5. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the LDR image 2 or a prediction base image based on the LDR image and the HDR image 4 may then be determined. The difference values may then be resorted 50. In some embodiments, these difference values may be resorted 50 according to the enumerated resorting processes described above. In some embodiments, the resorted values may be transformed 51 into transform coefficients using Fourier-type transform techniques (e.g., discrete cosine transforms, etc.) or other transform techniques. These transform coefficients may then be quantized 52. After quantization 52, in some embodiments, further processing and encoding may occur before transmission or storage.

Figure 6:
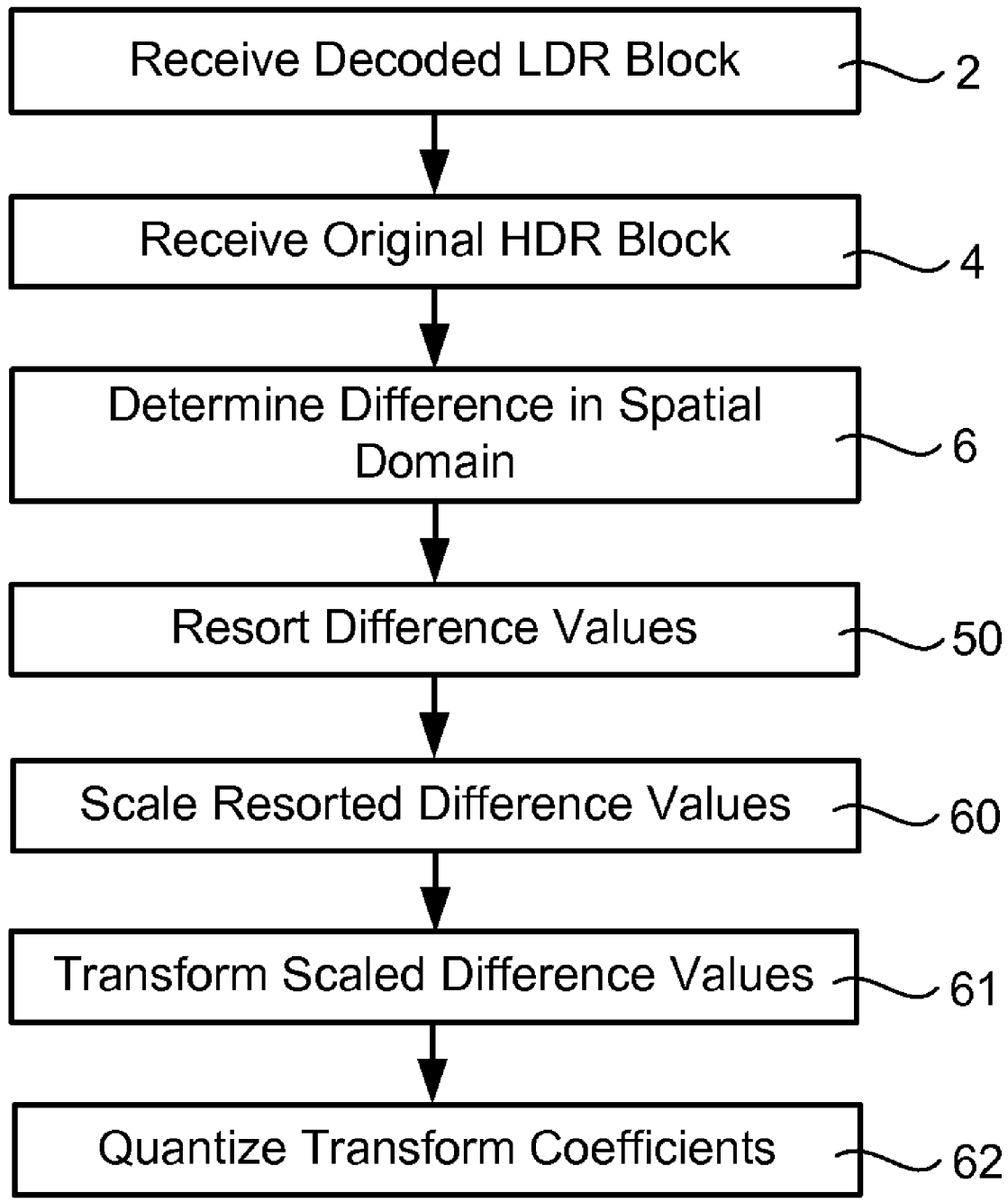
FIG. 6 is a chart showing an embodiment of the present invention comprising resorting of quantized difference values and scaling of those values prior to transformation.

Some embodiments of the present invention may be described in relation to FIG. 6. In these embodiments, one or more portions of a low dynamic range (LDR) image 2 are processed. This LDR image 2 may be decoded from an image, or portion thereof, that has been encoded for transmission or storage. A prediction base image may be created from the LDR image 2 or the LDR image 2 itself may be used as a prediction base image. A high dynamic range (HDR) version 4 of the same image portion is also obtained. The difference 6 between the LDR image 2 or a prediction base image based on the LDR image and the HDR image 4 may then be determined. The difference values may then be resorted 50. In some embodiments, these difference values may be resorted 50 according to the enumerated resorting processes described above. In some embodiments, these resorted difference values may be scaled 60. In some embodiments, this scaling may be variable. In some embodiments, this scaling may be image dependent and, in some embodiments, may be related to decoded LDR image values.

In some embodiments, the scaled values may be transformed 61 into transform coefficients using Fourier-type transform techniques (e.g., discrete cosine transforms, etc.) or other transform techniques. These transform coefficients may then be quantized 62. After quantization 62, in some embodiments, further processing and encoding may occur before transmission or storage.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for encoding image data, said method comprising:
  a) receiving a prediction base image based on a low dynamic range (LDR) image;
  b) receiving a high dynamic range (HDR) image corresponding to said LDR image;
  c) determining a difference image in the spatial domain, wherein said difference image represents the difference between said prediction base image and said HDR image;
  d) quantizing values of said difference image;
  e) sorting said quantized values of said difference image into an order, wherein said order is based on the values of corresponding pixels in said LDR image.

2. A method as described in claim 1 wherein said quantization is performed by treating said difference image values as transform coefficients in an AVC video codec.

3. A method as described in claim 1 wherein said quantization is performed by scaling said difference image values and treating said scaled difference image values as transform coefficients in an AVC video codec.

4. A method as described in claim 1 wherein said sorting comprises placing said quantized difference image values in an order wherein quantized difference image values corresponding to higher LDR image values are placed before quantized difference image values corresponding to lower LDR image values.

5. A method as described in claim 4 further comprising establishing a scan pattern, wherein quantized difference image values corresponding to the same LDR image value are ordered in scan pattern order.

6. A method as described in claim 1 further comprising:
  a) establishing a threshold value;
  b) wherein said quantized difference values corresponding to LDR image values above said threshold are placed in a group; and
  c) wherein said sorting comprises placing said quantized difference values in an order wherein values in said group are placed before values not in said group.

7. A method as described in claim 6 further comprising:
  a) establishing a scan pattern; and
  b) ordering quantized difference values in said group according to said scan pattern.

8. A method as described in claim 6 wherein values not in said group are set to zero.

9. A method as described in claim 1 further comprising:
  a) establishing a plurality of threshold values;
  b) wherein said quantized difference values are placed into a plurality of groups based on a relationship between their corresponding LDR image values and said plurality of threshold values; and
  c) said sorting comprises placing said quantized difference values in an order wherein values in one of said groups are placed before values in another of said groups.

10. A method as described in claim 9 further comprising:
  a) establishing a scan pattern; and
  b) ordering quantized difference values in said groups according to said scan pattern.

11. A method as described in claim 9 wherein said quantized difference image values in at least one of said groups are set to a constant value.

12. A method as described in claim 9 wherein said quantized difference image values in at least one of said groups are set to zero.

13. A method for encoding image data, said method comprising:
  a) receiving a prediction base image based on a low dynamic range (LDR) image;
  b) receiving a high dynamic range (HDR) image corresponding to said LDR image;
  c) determining a difference image in the spatial domain, said difference image comprising difference image values, wherein said difference image represents the difference between said prediction base image and said HDR image;

d) sorting said difference image values into an order, wherein said order is based on the values of corresponding pixels in said LDR image; and e) transforming said sorted difference image values into frequency domain coefficients.

14. A method as described in claim 13 further comprising quantizing said frequency domain coefficients.

15. A method for encoding image data, said method comprising:

a) receiving a prediction base image base on a low dynamic range (LDR) image;

b) receiving a high dynamic range (HDR) image corresponding to said LDR image;

c) determining a difference image in the spatial domain, said difference image comprising difference image values, wherein said difference image represents the difference between said prediction base image and said HDR image;

d) sorting said difference image values into an order, wherein said order is based on the values of corresponding pixels in said LDR image; and e) scaling said difference image values.

16. A method as described in claim 15 further comprising transforming said sorted difference image values into frequency domain coefficients.

17. A method as described in claim 15 wherein said scaling is variable and dependent on the value of a corresponding LDR image pixel.

18. A method as described in claim 15 wherein said scaling is performed according to the following equation:

$$W(x, y) = \frac{255}{1 + LDR(x, y)}$$

wherein W(x,y) and LDR(x,y) are respectively the value of the weighting function and decoded low dynamic range frame at pixel locations x and y.

19. A method for decoding image data, said method comprising:

a) receiving a prediction base image;

b) receiving a sorted difference image, wherein said difference image represents the difference between said prediction base image and an HDR image and wherein values of said image are sorted in a sorting order based on the values of corresponding pixels in a corresponding LDR image;

c) unsorting values in said sorted difference image from said sorting order based on the values of corresponding pixels in said LDR image to an order based on geometric location thereby creating an unsorted difference image; and d) combining said prediction base image with said unsorted difference image.

20. A method as described in claim 19 wherein said sorting order comprises quantized difference image values corresponding to higher LDR image values placed before quantized difference image values corresponding to lower LDR image values.

21. A method as described in claim 19 wherein said sorting order comprises quantized difference image values corresponding to LDR image values above a threshold in a group that is ordered before quantized difference image values corresponding to LDR image values below said threshold.

22. A method as described in claim 19 wherein said sorting order comprises quantized difference values placed into a plurality of groups based on a relationship between their corresponding LDR image values and a plurality of threshold values.

23. A method for decoding image data, said method comprising:

a) receiving a prediction base image;

b) receiving a sorted difference image, wherein said difference image represents the difference between said prediction base image and an HDR image and wherein values of said image are sorted in a sorting order based on the values of corresponding pixels in a corresponding LDR image;

c) receiving a signal flag indicating said sorting order;

d) unsorting values in said sorted difference image from said sorting order identified by said signal flag to an order based on geometric location thereby creating an unsorted difference image; and e) combining said prediction base image with said unsorted difference image.

* * * * *